United States Patent
Pritsker et al.

(10) Patent No.: US 12,081,247 B2
(45) Date of Patent: Sep. 3, 2024

(54) SYSTEMS AND METHODS FOR ELECTRONICALLY SCANNED ARRAY ANTENNAS

(71) Applicant: Intel Corporation, Santa Clara, CA (US)

(72) Inventors: Dan Pritsker, San Diego, CA (US); Colman Cheung, San Diego, CA (US); Benjamin Esposito, Pittsboro, NC (US)

(73) Assignee: Altera Corporation, San Jose, CA (US)

( * ) Notice: Subject to any disclaimer, the term of this patent is extended or adjusted under 35 U.S.C. 154(b) by 934 days.

(21) Appl. No.: 16/583,965

(22) Filed: Sep. 26, 2019

(65) Prior Publication Data

US 2020/0021320 A1  Jan. 16, 2020

(51) Int. Cl.
*H04B 7/06* (2006.01)
*H01Q 13/08* (2006.01)
*H04B 1/04* (2006.01)
*H04L 27/20* (2006.01)

(52) U.S. Cl.
CPC ......... *H04B 1/0475* (2013.01); *H01Q 13/085* (2013.01); *H04B 1/0483* (2013.01); *H04B 7/06* (2013.01); *H04L 27/2053* (2013.01)

(58) Field of Classification Search
CPC ...... H04B 1/0475; H04B 1/0028; H04B 7/00; H04B 1/0483; H04B 7/06; H04B 7/0848; H01Q 13/085; H01Q 3/42; H04L 27/2053
USPC ........................................................ 375/296
See application file for complete search history.

(56) References Cited

U.S. PATENT DOCUMENTS

| | | | |
|---|---|---|---|
| 6,975,267 B2 | 12/2005 | Stenger et al. | |
| 8,184,052 B1* | 5/2012 | Wu ........................... | H01Q 3/40 342/368 |
| 8,466,829 B1 | 6/2013 | Volman et al. | |
| 8,611,959 B2 | 12/2013 | Banu et al. | |
| 2004/0235439 A1* | 11/2004 | Husted ................. | H04B 17/309 455/179.1 |
| 2008/0297414 A1* | 12/2008 | Krishnaswamy ....... | H03L 7/087 342/368 |
| 2009/0004970 A1* | 1/2009 | Fruit .................. | H04B 7/18523 455/59 |

(Continued)

*Primary Examiner* — Syed Haider
(74) *Attorney, Agent, or Firm* — InventIQ Legal LLP; Steven J. Cahill

(57) ABSTRACT

An array of antennas includes transmitter and receiver circuits. The transmitter includes a digital-to-analog converter (DAC), splitter and filter circuits, mixer circuits, and antennas. The DAC circuit converts a digital signal into an analog signal. The splitter and filter circuits separate frequencies of the analog signal into split signals. The mixer circuits multiply frequencies from the split signals by different frequencies of carrier signals to generate modulated signals that are converted by the antennas into radio frequency (RF) signals. The receiver includes antennas, mixer circuits, a summing circuit, and an analog-to-digital converter (ADC). The antennas in the receiver receive RF signals that are converted into electrical signals. The mixer circuits multiply frequencies from the electrical signals with different frequencies of carrier signals. The outputs of the mixer circuits are summed by the summing circuit to generate a summed signal that is converted to digital by the ADC.

20 Claims, 7 Drawing Sheets

(56) References Cited

U.S. PATENT DOCUMENTS

| | | | | |
|---|---|---|---|---|
| 2011/0159809 A1* | 6/2011 | Kenington | ............... | H04B 7/15 |
| | | | | 455/20 |
| 2017/0302342 A1* | 10/2017 | Kurchuk | ................ | H04B 1/405 |
| 2018/0083813 A1 | 3/2018 | Novak et al. | | |
| 2018/0278299 A1* | 9/2018 | Morrison | ................. | H04B 7/04 |
| 2020/0367257 A1* | 11/2020 | Hormis | ................. | H04B 7/155 |
| 2021/0234596 A1* | 7/2021 | Ballantyne | ........... | H04B 17/336 |

* cited by examiner

SYSTEMS AND METHODS FOR ELECTRONICALLY SCANNED ARRAY ANTENNAS

FIELD OF THE DISCLOSURE

The present disclosure relates to electronic circuits, and more particularly, to systems and methods for electronically scanned array antennas.

BACKGROUND

A passive electronically scanned array (PESA) is a type of electronically scanned array antenna that electronically steers a beam of radio waves to points in different directions without moving the antennas in the array. In a PESA, all of the antennas in the array are connected to a single transmitter and/or a single receiver. The signals to the antennas pass through phase shift elements that delay the radio waves progressively to cause each antenna to emit wave fronts later than the previous antenna in the array, causing the resulting plane wave to be directed at an angle to the array. An active electronically scanned array (AESA) is another type of electronically scanned array antenna that uses a computer to electronically steer a beam of radio waves to points in different directions without moving the antennas in the array. In an AESA, each antenna is connected to a transmit/receive module (TRM) under the control of the computer. The TRM performs the functions of a transmitter and/or receiver for the antenna. An AESA can radiate multiple beams of radio waves at multiple frequencies simultaneously.

DETAILED DESCRIPTION

Figure 1:
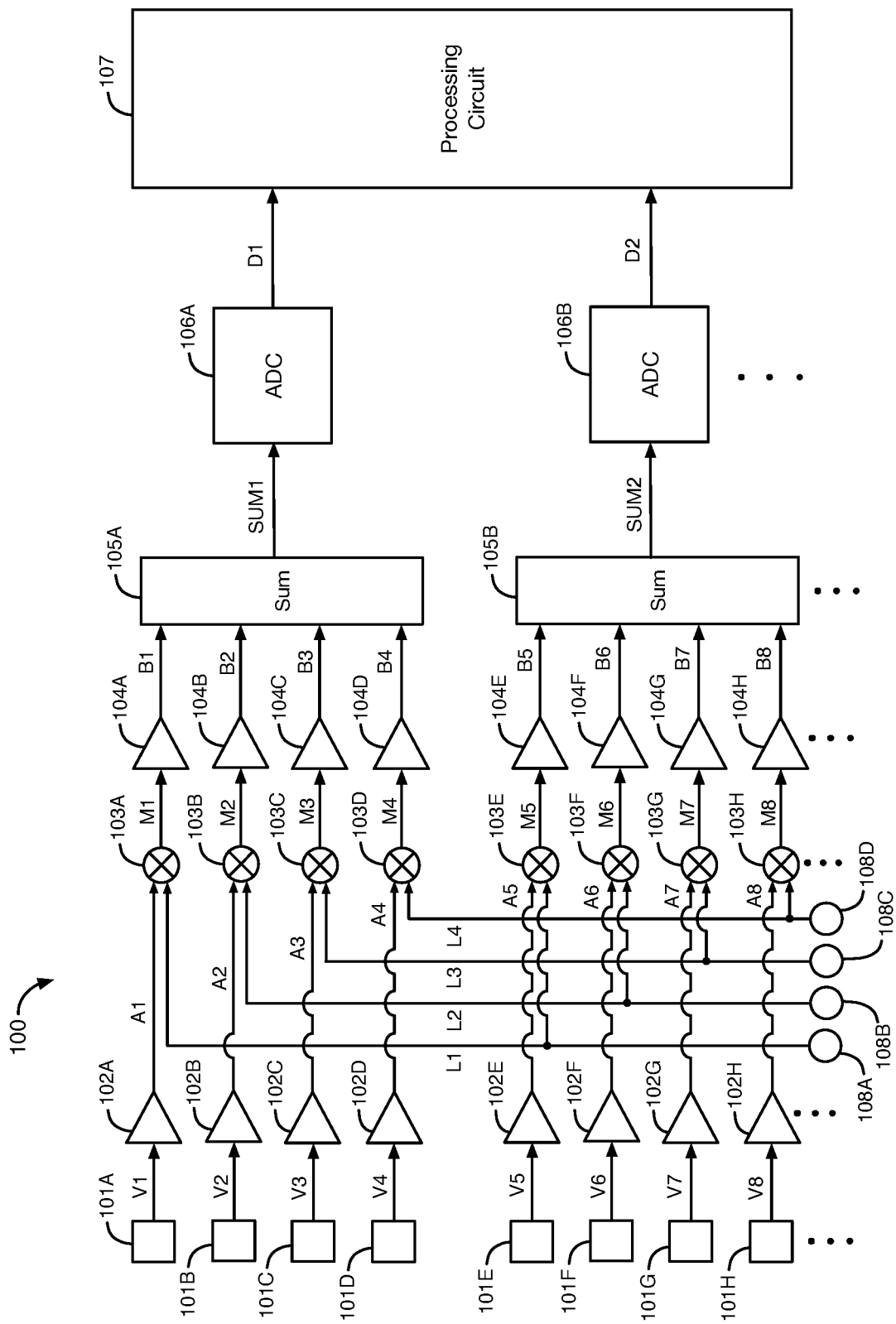
FIG. 1 illustrates an example of a receiver circuit in an electronically scanned array antenna system, according to an embodiment.

An active electronically scanned array (AESA) typically uses much more digital logic circuitry, analog-to-digital converter (ADC) circuits, and digital-to-analog converter (DAC) circuits than a passive electronically scanned array (PESA). Traditionally, the sampling rates of the ADC and DAC circuits were limiting factors that required baseband frequency translation. The availability of very fast samplers have made it possible to eliminate the frequency translation functions in analog circuitry in an AESA, which simplifies the hardware and enables wider instantaneous bandwidth. It would be advantageous to increase the number of antennas in an AESA to increase spatial (angular) resolution and to increase beamforming degrees of freedom. Increased degrees of freedom improves the ability to suppress jamming signals.

According to some embodiments disclosed herein, an electronically scanned array of antennas includes a transmitter and a receiver. The transmitter includes a processing circuit, digital-to-analog converter (DAC) circuits, splitter circuits, band pass filter circuits, mixer circuits, local oscillators, and an array of antennas that are grouped into banks. The processing circuit performs digital beam forming functions to generate one or more digital signals. Each of the DAC circuits converts a digital signal received from the processing circuit into an analog signal. The splitter circuit in each of the banks separates the analog signal received from one of the DAC circuits based on frequencies. Each of the band pass filter circuits filters split analog signals. Each of the mixer circuits multiples the frequency of one of the filtered signals by a frequency of a carrier signal received from one of the local oscillators. Each of the local oscillator circuits generates a carrier signal having a different frequency.

Each of the antennas in the transmitter converts the output signal of one of the mixer circuits into an RF signal. The electronically scanned array antenna can electronically steer the direction of the RF signals generated by the transmitter to point in different directions without moving the antennas by adjusting the delay provided to and/or the phase of each of the RF signals. Each of the antennas in the array may generate an RF signal having a different delay and/or a different phase than the RF signals generated by the other antennas in the array, such that each antenna progressively emits wave fronts later than the previous antenna in the array, to cause the resulting RF wave front to be pointed at an angle other than 90 degrees relative to the front surface of the array. The processing circuit generates the delays or phase shifts in the digital signals provided to the DAC circuits using digital beam forming algorithms to generate the delays or phase shifts in the RF signals for steering the RF wave front generated by the antennas in a selected direction. The receiver then receives RF signals generated by the transmitter or by another source of RF signals.

The receiver includes an array of antennas, mixer circuits, local oscillators, summing circuits, and analog-to-digital converter (ADC) circuits that are grouped into banks. Each of the antennas in the receiver receives a radio frequency (RF) signal. Each of the antennas in the receiver converts the received RF signal into an electrical signal that is provided to one of the mixer circuits. Each of the mixer circuits multiplies the frequency of the signal received from the corresponding one of the antennas with a frequency of a carrier signal generated by one of the local oscillators to generate an output signal. Each of the local oscillators generates a carrier signal having a different frequency. The output signals of the mixer circuits are filtered such that the filtered output signal of each mixer circuit has a non-overlapping bandwidth relative to the output signals of the other mixer circuits in the same bank. Frequencies from the filtered output signals of the mixer circuits in each bank are summed by a summing circuit to generate a summed signal. The summed signal is converted into a digital signal by an ADC circuit. The digital signal is then provided to the processing circuit. The processing circuit can then process the digital signals from one or more of the ADC circuits.

Figure (FIG. 1 illustrates an example of a receiver circuit 100 in an electronically scanned array antenna system, according to an embodiment. Receiver circuit 100 includes any number of antennas such as antennas 101A-101H, any number of amplification circuits such as amplification circuits 102A-102H, any number of mixer circuits such as mixer circuits 103A-103H, any number of amplification circuits such as amplification circuits 104A-104H, any number of summing circuits such as summing circuits 105A-105B, any number of analog-to-digital converter (ADC) circuits such as ADC circuits 106A-106B, a processing circuit 107, and any number of local oscillator circuits such as local oscillator circuits 108A-108D. Receiver circuit 100 can include other antennas, amplification circuits, mixer circuits, summing circuits, and ADC circuits in addition to the circuits shown in FIG. 1. An electronically scanned array antenna may also be referred to as a phased array antenna. The electronically scanned array antenna system of FIGS. 1-6 may be an active or passive electronically scanned array antenna system.

The circuits shown in FIG. 1 can be formed in one or more integrated circuit (IC) dies. Processing circuit 107 may, for example, be in a field programmable gate array (FPGA) IC, a microprocessor IC, a graphics processing unit IC, or an application specific IC (ASIC). The other circuits 101-106 and 108 shown in Figure (FIG. 1 may be in the same IC die as processing circuit 107 or in one or more different IC dies.

The circuitry in receiver circuit 100 is arranged in any number of banks. Two banks are shown in FIG. 1 as an example. The first bank includes antennas 101A-101D, amplification circuits 102A-102D, mixer circuits 103A-103D, amplification circuits 104A-104D, summing circuit 105A, and ADC circuit 106A. The second bank includes antennas 101E-101H, amplification circuits 102E-102H, mixer circuits 103E-103H, amplification circuits 104E-104H, summing circuit 105B, and ADC circuit 106B. Each of the banks can include any number of channels. FIG. 1 shows 4 channels in each of the banks in receiver circuit 100 as an example. Each of the channels includes one of the antennas 101, one of the amplification circuits 102, one of the mixer circuits 103, and one of the amplification circuits 104 that are coupled together in series. For example, the first channel shown in FIG. 1 includes antenna 101A, amplification circuit 102A, mixer circuit 103A, and amplification circuit 104A. In other embodiments, each of the banks in receiver circuit 100 can include more or less than 4 channels.

Figure 6:
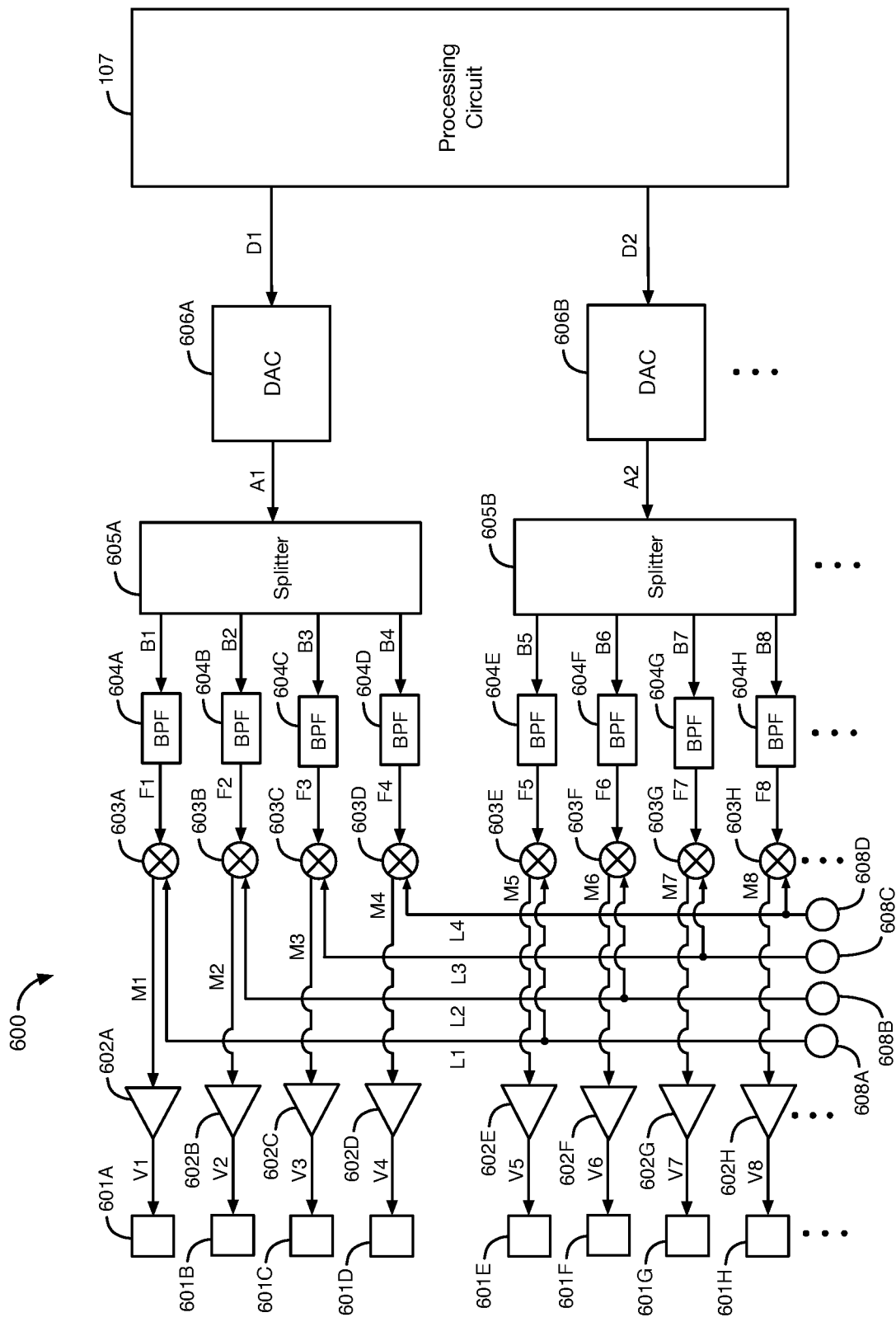
FIG. 6 illustrates an example of the transmitter circuit in the electronically scanned array antenna system, according to an embodiment.

The electronically scanned array antenna system of FIG. 1 includes receiver circuit 100 and a transmitter circuit 600 that is disclosed herein with respect to FIG. 6. Each of the antennas 101A-101H in the receiver circuit 100 receives a wireless electromagnetic radio frequency (RF) signal. The RF signals may, for example, be echoes of electromagnetic RF signals generated by the transmitter circuit 600. As another example, the RF signals received by the receiver 100 may be generated by another source of RF signals. Each of the antennas 101A-101H converts the received RF signal into an electrical signal (V1-V8) that is provided to an input of a respective one of the amplification circuits 102A-102H. Electrical signals V1-V8 may be, for example, voltage or current signals. In some embodiments, antennas 101A-101H may be used for receiving and transmitting RF signals in alternating time intervals. In other embodiments, antennas 101A-101H may only be used for receiving RF signals, but not for transmitting RF signals.

Figure 2A:
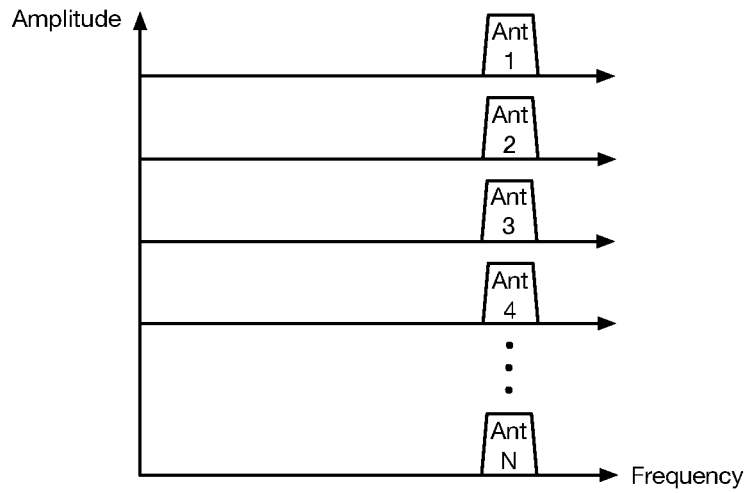
FIG. 2A illustrates examples of the frequencies of the signals generated by an N number of antennas in the receiver circuit of FIG. 1 based on the received radio frequency (RF) signals, according to an embodiment.

The electrical signals V1-V8 generated by the antennas 101A-101H based on the received RF signals have the same or approximately the same frequency bandwidth and different phases. FIG. 2A illustrates examples of the frequencies of the electrical signals generated by an N number of the antennas 101 (Ant 1, Ant 2, Ant 3, Ant 4, . . . Ant N) in one of the banks of receiver circuit 100 based on the received RF signals. As shown in FIG. 2A, each of the electrical signals generated by the antennas 101 in FIG. 1 have the same or approximately the same frequency bandwidth.

The signals V1-V8 generated by antennas 101A-101H based on the received RF signals are provided through conductors to inputs of amplification circuits 102A-102H, respectively, as shown in FIG. 1. Amplification circuits 102A-102H amplify signals V1-V8 received from antennas 101A-101H to generate amplified signals A1-A8 that are provided through conductors to first inputs of mixer circuits 103A-103H, respectively. In some embodiments, amplification circuits 102A-102H may also include additional analog circuitry (e.g., filters).

Each of the local oscillator circuits 108A-108D generates a carrier signal having a different frequency. Local oscillator circuits 108A-108D generate 4 different carrier signals L1-L4 having 4 different frequencies. The 4 carrier signals L1-L4 generated by local oscillator circuits 108A-108D are provided through conductors to second inputs of mixer circuits 103A-103D, respectively. The 4 carrier signals L1-L4 generated by local oscillator circuits 108A-108D are also provided through conductors to second inputs of mixer circuits 103E-103H, respectively.

Each of the mixer circuits 103A-103H multiplies the frequency of the respective one of the amplified signals A1-A8 with the frequency of the carrier signal generated by the respective one of the local oscillator circuits 108A-108D to generate a demodulated output signal. Mixer circuits 103A-103D multiply the frequencies of amplified signals A1-A4 by the frequencies of carrier signals L1-L4 to generate demodulated output signals M1-M4, respectively. Mixer circuits 103E-103H multiply the frequencies of amplified signals A5-A8 by the frequencies of carrier signals L1-L4 to generate demodulated output signals M5-M8, respectively.

Because each of the carrier signals L1-L4 has a different and unique frequency relative to the other 3 carrier signals L1-L4, each of the demodulated signals M1-M4 generated by mixer circuits 103A-103D has a different and non-overlapping spectrum of frequencies, and each of the demodulated signals M5-M8 generated by mixer circuits 103E-103H has a different and non-overlapping spectrum of frequencies, excluding any undesired harmonics in signals M1-M8. The target bandwidths of signals M1-M8 can be around the baseband frequency or intermediate frequencies.

Signals M1-M8 are provided through conductors to inputs of amplification circuits 104A-104H, respectively. Each of the amplification circuits 104A-104H includes a low pass filter (LPF) circuit and an amplifier circuit. The mixer circuits 103A-103H may generate harmonics in signals M1-M8. The LPF circuits in amplification circuits 104A-104H filter out the undesired harmonics in the demodulated signals M1-M8 generated by the mixer circuits 103A-103H, respectively, to generate filtered demodulated signals. The filtered demodulated signals generated by the LPF circuits are amplified by the amplifier circuits in circuits 104A-104H to generate amplified and filtered signals B1-B8, respectively. Thus, amplification circuits 104A-104H low pass filter and amplify signals M1-M8 to generate amplified and filtered signals B1-B8, respectively. In some embodiments, amplification circuits 104A-104H may also include additional analog circuitry.

Figure 2B:
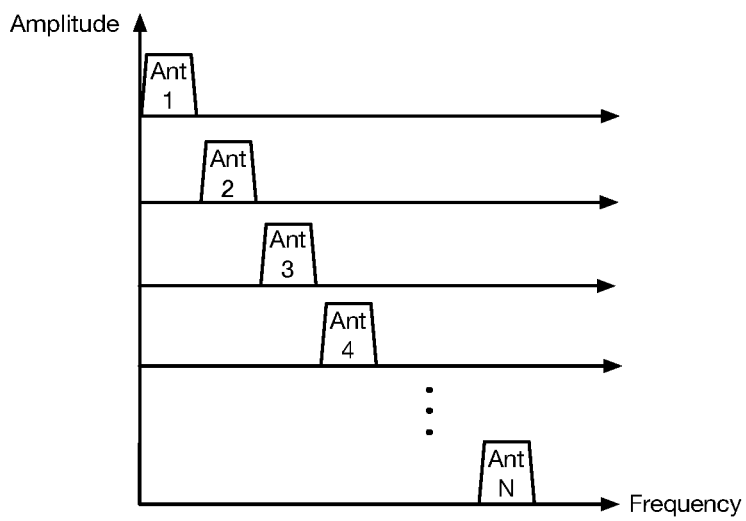
FIG. 2B illustrates examples of the frequencies of an N number of demodulated, filtered, and amplified signals generated by an N number of the mixer circuits and an N number of the amplification circuits in one of the banks in the receiver circuit of FIG. 1, according to an embodiment.

FIG. 2B illustrates examples of the frequencies of an N number of demodulated, filtered, and amplified signals generated by an N number of the mixer circuits 103 and an N number of the amplification circuits 104 in one of the banks in the receiver circuit 100, according to an embodiment. Each of the N number of signals in FIG. 2B is generated based on an electrical signal generated by a different one of the antennas 101 (Ant 1, Ant 2, Ant 3, Ant 4, . . . Ant N) in one of the banks. The demodulated, filtered, and amplified signals of FIG. 2B are frequency shifted, such that the bandwidth of each of these signals does not overlap with the bandwidth of any of the other signals generated by the other amplification circuits 104 in the same bank. Because signals B1-B4 (and signals B5-B8) in each bank have different and non-overlapping bandwidths, and because ADC circuits 106A-106B have wide bandwidths, each of the ADC circuits 106A-106B can convert analog signals generated from multiple antennas 101 (e.g., 4 or more in a bank) into a digital signal.

The amplified signals B1-B4 generated in the first bank are provided through conductors to inputs of summing circuit 105A, and the amplified signals B5-B8 generated in the second bank are provided through conductors to inputs of summing circuit 105B. Summing circuits 105A-105B are analog summing circuits. Summing circuit 105A sums analog signals B1-B4 in the first bank to generate a first summed analog signal SUM1. Summing circuit 105B sums analog signals B5-B8 in the second bank to generate a second summed analog signal SUM2.

Figure 2C:
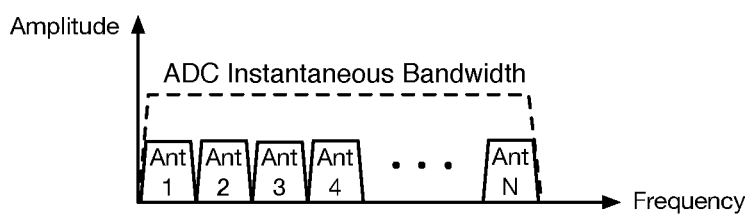
FIG. 2C illustrates an example of the frequency bandwidth of the summed signal generated by one of the summing circuits in one of the banks in the receiver circuit of FIG. 1, according to an embodiment.

FIG. 2C illustrates an example of the frequency bandwidth of the summed signal SUM1 or SUM2 generated by one of the summing circuits 105A-105B in one of the banks in the receiver circuit 100, according to an embodiment. As shown in FIG. 2C, the summed signal includes the frequencies of each of the demodulated, filtered, and amplified signals (e.g., B1-B4 or B5-B8) generated by one of the banks in the receiver circuit 100. The summing circuit 105A or 105B combines the frequencies of the signals generated by the amplification circuits 104 in one of the banks to generate a continuous summed signal, as shown in FIG. 2C.

The bandwidth of the summed signal is equal to or less than the instantaneous bandwidth of the respective ADC circuit 106, which is shown as a dotted line in FIG. 2C. The bandwidth of the summed signal SUM1 is equal to or less than the instantaneous bandwidth of ADC circuit 106A, and the bandwidth of the summed signal SUM2 is equal to or less than the instantaneous bandwidth of ADC circuit 106B. Each of the ADC circuits 106A-106B has a wide bandwidth.

As a result, the bandwidth of ADC circuit 106A is greater than or equal to the bandwidth of summed signal SUM1, which may contain non-overlapping frequencies from 4 frequency shifted demodulated and filtered signals B1-B4. Also, the bandwidth of ADC circuit 106B is greater than or equal to the bandwidth of summed signal SUM2, which may contain non-overlapping frequencies from 4 frequency shifted demodulated and filtered signals B5-B8.

Signals SUM1 and SUM2 are provided to inputs of ADC circuits 106A and 106B, respectively. ADC circuit 106A converts the analog summed signal SUM1 into one or more digital signals D1. ADC circuit 106B converts the analog summed signal SUM2 into one or more digital signals D2. Because the bandwidth of each of the ADC circuits 106A and 106B is large enough to support frequency shifted spectrums from multiple filtered demodulated analog signals (e.g., 4 signals in the example of FIG. 1) from multiple antennas 101, each of the ADC circuits 106A and 106B converts multiple filtered demodulated analog signals into one or more digital signals. As a result, receiver circuit 100 can have a larger number of channels in each bank, including a larger number of antennas 101 in each bank, without requiring additional digital circuitry in processing circuit 107 or additional ADC circuits 106.

Digital signals D1 and D2 are provided to inputs of processing circuit 107. Processing circuit 107 may then perform a variety of digital processing functions on the information indicated by the digital signals D1 and D2.

Figure 3:
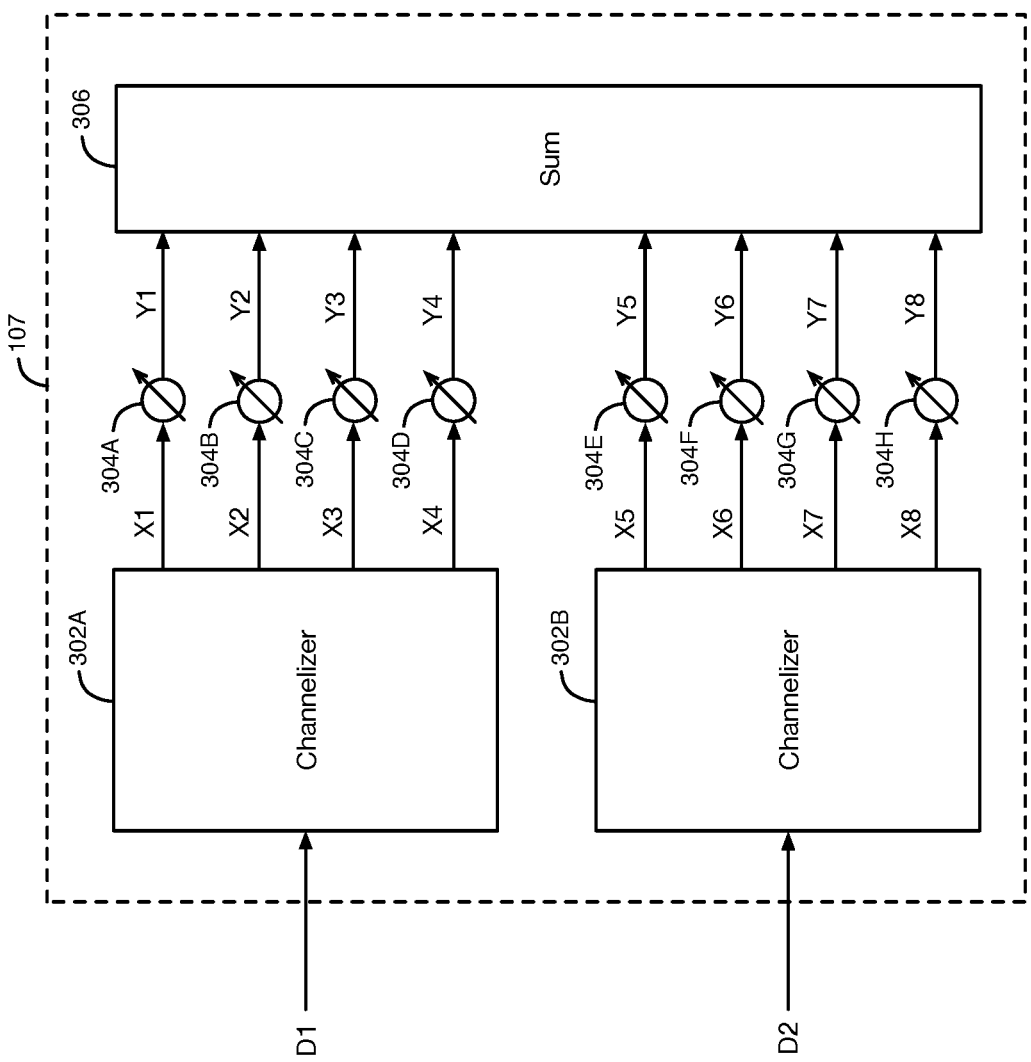
FIG. 3 illustrates further details of the processing circuit of FIG. 1, according to an exemplary embodiment.

FIG. 3 illustrates further details of processing circuit 107, according to an exemplary embodiment. In the example of FIG. 3, processing circuit 107 includes 2 channelizer circuits 302A-302B, 8 timing circuits 304A-304H, and a summing circuit 306. The circuitry of FIG. 3 may, for example, be implemented by programmable logic circuitry in an FPGA. In the embodiment of FIG. 3, the digital signals D1 and D2 generated by ADC circuits 106A-106B are provided to inputs of channelizer circuits 302A and 302B, respectively. Channelizer circuit 302A separates the frequencies of the signals received by each of the 4 antennas 101A-101D in the first bank in the digital domain into four digital output signals X1-X4. As a result, digital signals X1, X2, X3, and X4 have frequencies that are from the demodulated and filtered signals B1, B2, B3, and B4, respectively. Channelizer circuit 302B separates the frequencies of the signals received by each of the 4 antennas 101E-101H in the second bank in the digital domain into four digital output signals X5-X8. As a result, digital signals X5, X6, X7, and X8 have frequencies that are from the demodulated and filtered signals B5, B6, B7, and B8, respectively.

Digital signals X1-X8 are provided to inputs of circuits 304A-304H, respectively. Circuits 304A-304H may be, for example, phase shift circuits or time delay filter circuits. Circuits 304A-304H delay or shift the phases of the digital signals X1-X8 corresponding to the direction of the beam. The digital output signals Y1-Y8 of circuits 304A-304H have the frequencies of the digital input signals X1-X8, respectively, with the delays or phase shifts reflecting the desired beam direction. The digital signals Y1-Y8 are provided to inputs of summing circuit 306. Summing circuit 306 sums signals Y1-Y8 in the digital domain. Processing circuit 107 contains additional processing circuitry (not shown in FIG. 3) that performs digital processing functions on the information indicated by the summed signal generated by summing circuit 306.

Figure 4:
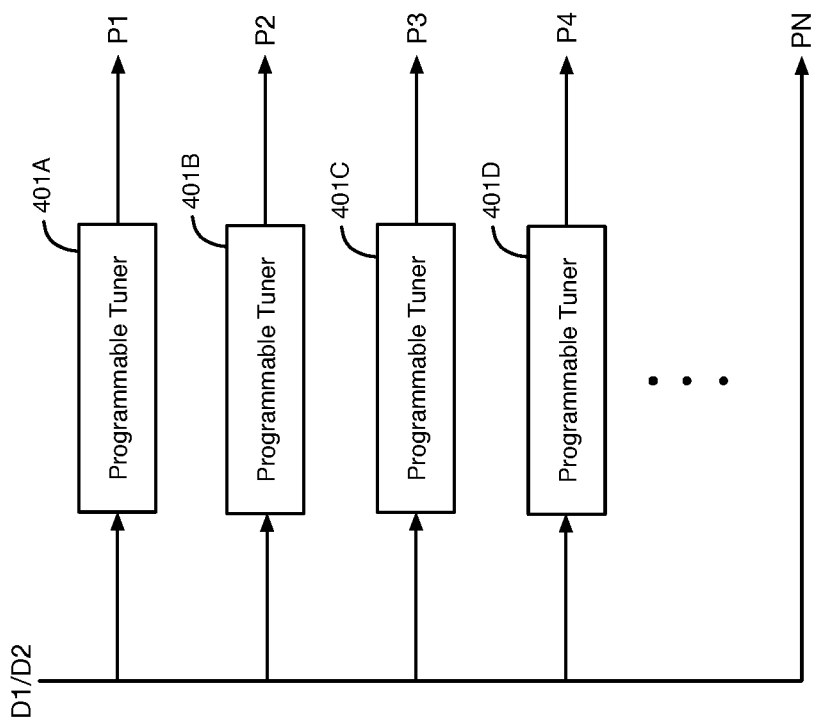
FIG. 4 illustrates examples of programmable tuner circuits that can be used to separate the frequencies of the signals received by each of the antennas in each of the banks in the receiver circuit of FIG. 1, according to an embodiment.

FIG. 4 illustrates examples of programmable tuner circuits 401 that can be used to separate the frequencies of the signals received by each of the antennas in each of the banks in the receiver circuit 100, according to an embodiment. The embodiment of FIG. 4 includes any number of programmable tuner circuits for each bank, such as programmable tuner circuits 401A-401D. As a specific example that is not intended to be limiting, there may be 16 programmable tuner circuits 401 for each bank. The group of programmable tuner circuits 401 shown in FIG. 4 may, for example, be implemented in processing circuit 107 in FIG. 1. The receiver circuit 100 includes one set of programmable tuner circuits 401 for each of the banks of channels. Signal D1 from ADC circuit 106A in the first bank or signal D2 from ADC circuit 106B in the second bank is provided to an input of each of the programmable tuner circuits 401.

Each of the programmable tuner circuits 401 generates an output signal that includes frequencies from one of the antennas 101 in the bank. For example, programmable tuner circuits 401A-401D in the first bank generate output signals P1-P4 that include frequencies from antennas 101A-101D, respectively. Programmable tuner circuits 401A-401D in the second bank generate output signals P1-P4 that include frequencies from antennas 101E-101H, respectively. Signal D1 or D2 is also provided directly to output signal DN to bypass the programmable tuners 401. Processing circuit 107 contains additional processing circuitry (not shown in FIG. 4) that performs digital processing functions on the information indicated by signals P1-PN, for example, using digital beam forming algorithms.

Figure 5:
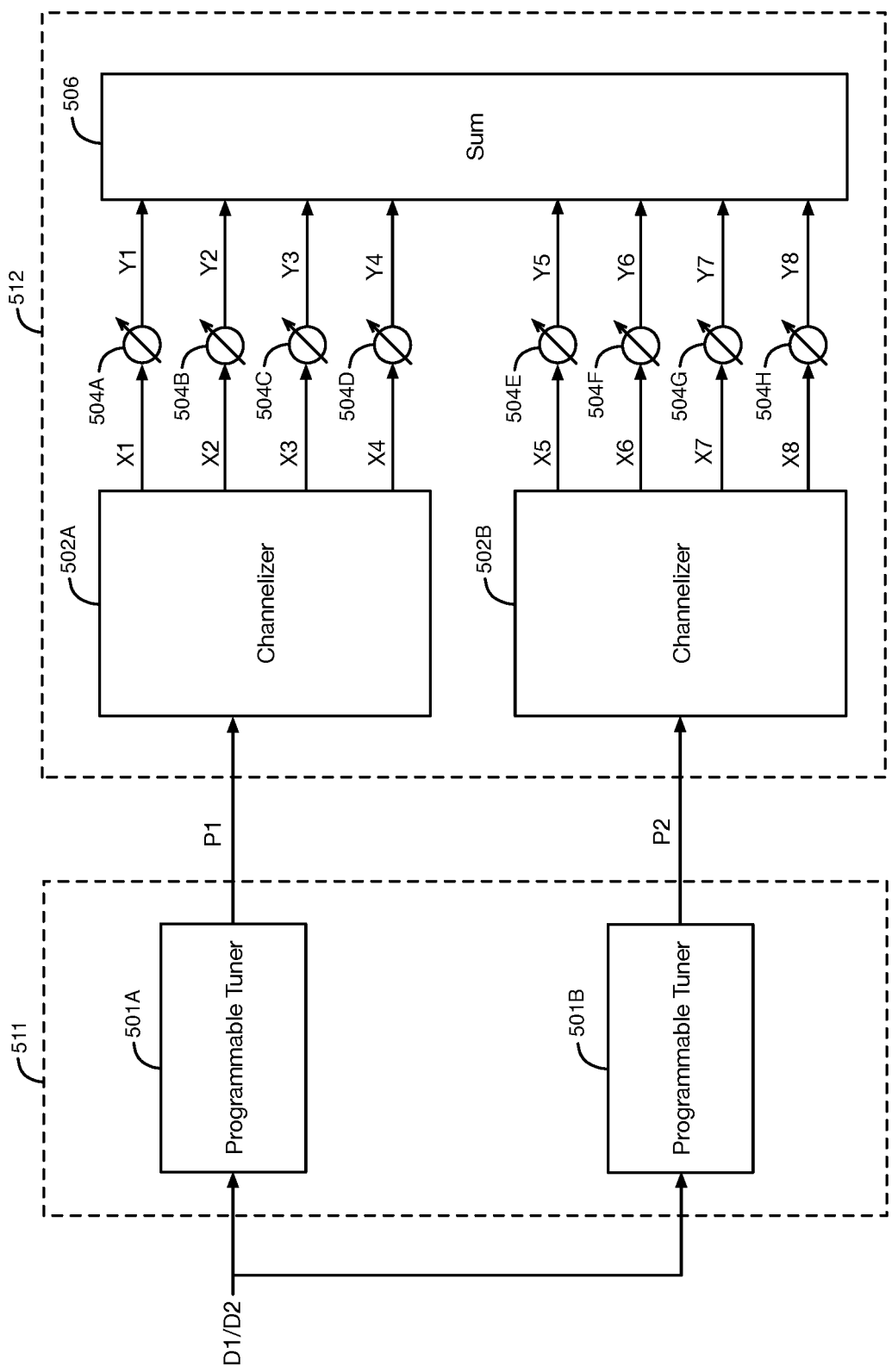
FIG. 5 illustrates another example of circuitry in the processing circuit that can be used to separate the frequencies of the signals from each of the antennas in each of the banks in the receiver circuit of FIG. 1, according to another embodiment.

FIG. 5 illustrates an additional example of circuitry in processing circuit 107 that can be used to separate the frequencies of the signals from each of the antennas 101 in each of the banks in the receiver circuit 100, according to another embodiment. The embodiment of FIG. 5 is a hybrid solution of FIGS. 3 and 4 that includes programmable tuner circuits 501A-501B and channelizer circuits 502A-502B. The embodiment of FIG. 5 also includes 8 timing circuits 504A-504H and a summing circuit 506. In an exemplary implementation of FIG. 5, programmable tuner circuits 501A-501B may be implemented in a first IC 511, and the channelizer circuits 502A-502B, circuits 504A-504H, and summing circuit 506 may be implemented by programmable logic circuitry in a second programmable logic IC 512.

In the embodiment of FIG. 5, each of the programmable tuner circuits 501 generates an output signal that includes signals from the antennas 101 in one of the banks. Thus, programmable tuner circuit 501A generates an output signal P1 that includes signals from antennas 101A-101D in response to signal D1, and programmable tuner circuit 501B generates an output signal P2 that includes signals from antennas 101E-101H in response to signal D2. Signals P1-P2 are provided to inputs of channelizer circuits 502A-502B, respectively.

Channelizer circuit 502A separates the frequencies of the signals from each of the 4 antennas 101A-101D and indicated by signal P1 in the digital domain into four digital output signals X1-X4 that have frequencies from demodulated and filtered signals B1-B4, respectively. Channelizer circuit 502B separates the frequencies of the signals from each of the 4 antennas 101E-101H and indicated by signal P2 in the digital domain into four digital output signals X5-X8 that have frequencies from demodulated and filtered signals B5-B8, respectively.

Digital signals X1-X8 are provided to inputs of circuits 504A-504H, respectively. Circuits 504A-504H may be, for example, phase shift circuits or time delay filter circuits. Circuits 504A-504H delay or shift the phases of the digital signals X1-X8 corresponding to the direction of the beam. The digital output signals Y1-Y8 of circuits 504A-504H have the frequencies of the digital input signals X1-X8, respectively, with the delays or phase shifts reflecting the desired beam direction. The digital signals Y1-Y8 are provided to inputs of summing circuit 506. Summing circuit 506 sums signals Y1-Y8 in the digital domain. Processing circuit 107 contains additional processing circuitry (not shown in FIG. 5) that performs digital processing functions on the information indicated by the summed signal generated by summing circuit 506, for example, using digital beam forming algorithms.

FIG. 6 illustrates an example of the transmitter circuit 600 in the electronically scanned array antenna system, according to an embodiment. Transmitter circuit 600 includes any number of transmitting antennas such as transmitting antennas 601A-601H, any number of amplification circuits such as amplification circuits 602A-602H, any number of mixer circuits such as mixer circuits 603A-603H, any number of band pass filter circuits such as band pass filter (BPF) circuits 604A-604H, any number of splitter circuits such as splitter circuits 605A-605B, any number of digital-to-analog converter (DAC) circuits such as DAC circuits 606A-606B, processing circuit 107, and any number of local oscillator circuits such as local oscillator circuits 608A-608D. Transmitter circuit 600 can include other antennas, amplification circuits, mixer circuits, BPF circuits, splitter circuits, and DAC circuits in addition to the circuits shown in FIG. 6. The circuits shown in FIG. 6 can be formed in one or more integrated circuit (IC) dies. The circuits 601-606 and 608 of FIG. 6 may be in the same IC die as processing circuit 107 or in one or more different IC dies.

The circuitry in transmitter circuit 600 is arranged in any number of banks. Two banks are shown in FIG. 6 as an example. The first bank includes antennas 601A-601D, amplification circuits 602A-602D, mixer circuits 603A-603D, BPF circuits 604A-604D, splitter circuit 605A, and DAC circuit 606A. The second bank includes antennas 601E-601H, amplification circuits 602E-602H, mixer circuits 603E-603H, BPF circuits 604E-604H, splitter circuit 605B, and DAC circuit 606B. Each of the banks in transmitter circuit 600 includes 4 channels in FIG. 6 as an example. Each of the channels includes one of the antennas 601, one of the amplification circuits 602, one of the mixer circuits 603, and one of the BPF circuits 604 that are coupled together in series. For example, the first channel shown in FIG. 6 includes antenna 601A, amplification circuit 602A, mixer circuit 603A, and BPF circuit 604A. In other embodiments, each of the banks in transmitter circuit 600 can include more or less than 4 channels.

The processing circuit 107 performs digital beam forming algorithms/functions to generate digital signals D1 and D2 that are provided to inputs of DAC circuits 606A-606B, respectively. As an example that is not intended to be limiting, processing circuit 107 may generate digital signals D1 and D2 using information from the RF signals received by receiver circuit 100. DAC circuits 606A-606B convert digital signals D1 and D2 into analog signals A1 and A2, respectively. Signals A1 and A2 are provided to inputs of splitter circuits 605A-605B, respectively. The splitter circuits 605A-605B separate the analog signals A1-A2 received from DAC circuits 606A-606B, respectively, to generate a signal in each of the channels. Splitter circuit 605A splits the frequencies of signal A1 to generate 4 signals B1-B4 in the 4 channels in the first bank. Splitter circuit 605B splits the frequencies of signal A2 to generate 4 signals B5-B8 in the 4 channels in the second bank.

Signals B1-B8 are provided through conductors to inputs of BPF circuits 604A-604H, respectively. BPF circuits 604A-604H filter out undesired frequencies (e.g., harmonics) from signals B1-B8 to generate filtered output signals F1-F8, respectively. BPF circuits 604A-604D cause each of the filtered signals F1-F4 to have a different and non-overlapping bandwidth relative to the other signals F1-F4 in the first bank, as shown, for example, in FIG. 2B. BPF circuits 604E-604H cause each of the filtered signals F5-F8 to have a different and non-overlapping bandwidth relative to the other signals F5-F8 in the second bank, as shown, for example, in FIG. 2B. Filtered signals F1-F8 may, as an example, have different phases and/or delays that were added by processing circuit 107 according to a digital beam forming algorithm.

Filtered signals F1-F8 are provided through conductors to first inputs of mixer circuits 603A-603H, respectively. Mixer circuits 603A-603H multiply the frequencies of filtered signals F1-F8, respectively, by the frequencies of carrier signals L1-L4 received from local oscillators 608A-608D as shown in FIG. 6. Local oscillator circuits 608A-608D generate 4 carrier signals L1-L4 having 4 different frequencies. Each of the 4 carrier signals L1-L4 generated by oscillators 608A-608D has a different and unique frequency relative to the other three carrier signals L1-L4. In some embodiments, the local oscillator circuits 608A-608D may provide the same 4 carrier signals L1-L4 having the same frequencies to the transmitter circuit 600 that are provided to the receiver circuit 100. In other embodiments, the local oscillator circuits 608A-608D may provide different carrier signals L1-L4 having different frequencies to the transmitter circuit 600 than the carrier signals provided to the receiver circuit 100. Mixer circuits 603A-603D multiply the frequencies of signals F1-F4 by the frequencies of carrier signals L1-L4 to generate 4 modulated signals M1-M4, respectively. Mixer circuits 603E-603H multiply the frequencies of signals F5-F8 by the frequencies of carrier signals L1-L4 to generate 4 modulated signals M5-M8, respectively. Mixer circuits 603A-603H shift the frequencies of signals F1-F8 to cause the modulated signals M1-M8, respectively, to have the same or approximately the same bandwidth. The modulated signals M1-M8 generated by mixer circuits 603A-603H are provided through conductors to inputs of amplification circuits 602A-602H, respectively.

Amplification circuits 602A-602H amplify the modulated signals M1-M8 received from mixer circuits 603A-603H to generate amplified signals V1-V8 that are provided through conductors to inputs of antennas 601A-601H, respectively. In some embodiments, amplification circuits 602A-602H may also include low pass filter circuits or band pass filter circuits that remove undesired harmonics in the modulated signals to generate filtered signals. In these embodiments, the amplification circuits 602A-602H also include amplifier circuits that amplify the filtered signals to generate the amplified signals V1-V8. The signals V1-V8 generated by amplification circuits 602A-602H have the same or approximately the same frequency bandwidth, as shown, for example, in FIG. 2A.

The antennas 601A-601H in the transmitter circuit 600 convert the signals V1-V8 received from amplification circuits 602A-602H, respectively, into electromagnetic radio frequency (RF) signals. Antennas 601A-601H generate (i.e., transmit) the RF signals based on frequencies from the signals V1-V8 received from the amplification circuits 602A-602H, respectively. The transmitter circuit 600 can transmit the RF signals generated by antennas 601A-601H toward target objects. Each of the antennas 601A-601H can generate an RF signal having a different delay and/or phase than the RF signals generated by the other antennas in the transmitter circuit 600, such that each of the antennas 601A-601H progressively emits wave fronts later than the previous antenna in the transmitter circuit 600, to cause the resulting RF wave front to be pointed at an angle other than 90 degrees relative to the front surface of the array of antennas 601A-601H.

In some embodiments, antennas 601A-601H may be used for receiving and transmitting RF signals in alternating time intervals. For example, antennas 601A-601H may be the same antennas as antennas 101A-101H, respectively. In these embodiments, the electronically scanned array antenna system may also include a circulator that isolates the receiver circuitry and the transmitter circuitry during the alternating time intervals. In other embodiments, antennas 601A-601H may only be used for transmitting RF signals, but not for receiving RF signals.

Figure 7:
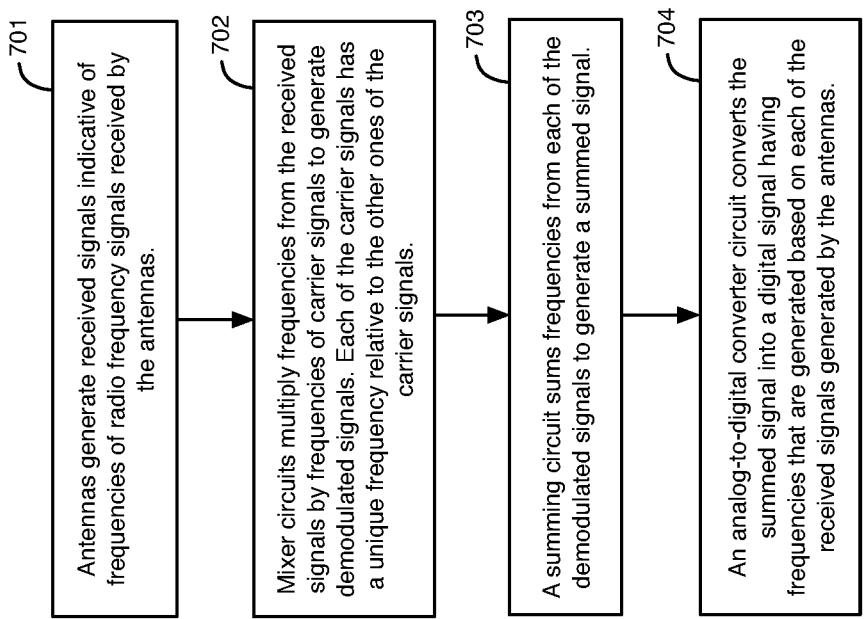
FIG. 7 is a flow chart that illustrates examples of operations for receiving radio frequency signals at a receiver circuit in an electronically scanned array antenna system, according to an embodiment.

FIG. 7 is a flow chart that illustrates examples of operations for receiving radio frequency signals at a receiver circuit in an electronically scanned array antenna system, according to an embodiment. In operation 701, antennas generate received signals indicative of frequencies of radio frequency signals received by the antennas. In operation 702, mixer circuits multiply frequencies from the received signals by frequencies of carrier signals to generate demodulated signals. Each of the carrier signals has a unique frequency relative to the other ones of the carrier signals. In operation 703, a summing circuit sums frequencies from each of the demodulated signals to generate a summed signal. In operation 704, an analog-to-digital converter circuit converts the summed signal into a digital signal having frequencies that are generated based on each of the received signals generated by the antennas.

Figure 8:
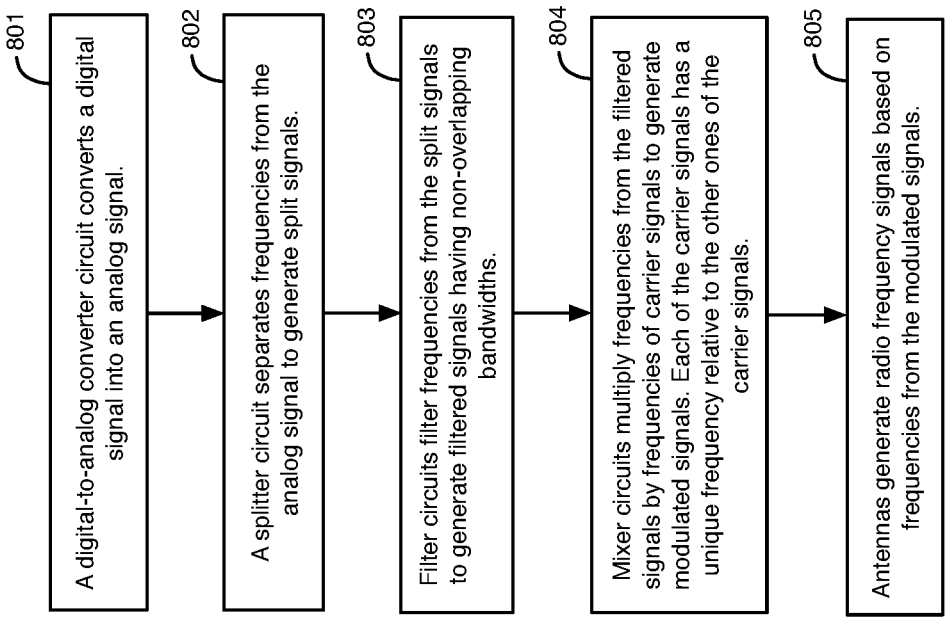
FIG. 8 is a flow chart that illustrates examples of operations for transmitting radio frequency signals using a transmitter circuit in an electronically scanned array antenna system, according to an embodiment.

FIG. 8 is a flow chart that illustrates examples of operations for transmitting radio frequency signals using a transmitter circuit in an electronically scanned array antenna system, according to an embodiment. In operation 801, a digital-to-analog converter circuit converts a digital signal into an analog signal. In operation 802, a splitter circuit separates frequencies from the analog signal to generate split signals. In operation 803, filter circuits filter frequencies from the split signals to generate filtered signals having non-overlapping bandwidths. In operation 804, mixer circuits multiply frequencies from the filtered signals by frequencies of carrier signals to generate modulated signals. Each of the carrier signals has a unique frequency relative to the other ones of the carrier signals. In operation 805, antennas generate radio frequency signals based on frequencies from the modulated signals.

The following examples pertain to further embodiments. Example 1 is an electronically scanned array antenna system comprising a receiver circuit, wherein the receiver circuit comprises: first antennas that generate first received signals indicative of frequencies of first radio frequency signals received by the first antennas; first mixer circuits that multiply frequencies from the first received signals by frequencies of carrier signals to generate first demodulated signals, wherein each of the carrier signals has a unique frequency relative to the other ones of the carrier signals; a first summing circuit that sums frequencies from each of the first demodulated signals to generate a first summed signal; and a first analog-to-digital converter circuit that converts the first summed signal into a first digital signal having frequencies that are generated based on each of the first received signals generated by the first antennas.

In Example 2, the electronically scanned array antenna system of Example 1 can optionally include, wherein the receiver circuit further comprises: amplification circuits that generate amplified signals by amplifying the first received signals, wherein the first mixer circuits multiply frequencies of the amplified signals by the frequencies of the carrier signals to generate the first demodulated signals.

In Example 3, the electronically scanned array antenna system of any one of Examples 1-2 can optionally include, wherein the receiver circuit further comprises: amplification circuits that generate amplified signals by amplifying the first demodulated signals, wherein each of the amplification circuits comprises a low pass filter circuit that filters one of the first demodulated signals to generate one of the amplified signals, and wherein the first summing circuit sums frequencies from the amplified signals to generate the first summed signal.

In Example 4, the electronically scanned array antenna system of any one of Examples 1-3 can optionally include, wherein the receiver circuit further comprises: a channelizer circuit that separates frequencies from the first digital signal in the digital domain into first digital output signals based on the frequencies of the first radio frequency signals received by the first antennas, wherein each of the first digital output signals has frequencies from a different one of the first demodulated signals.

In Example 5, the electronically scanned array antenna system of Example 4 can optionally include, wherein the receiver circuit further comprises: timing circuits that generate second digital output signals by delaying or shifting phases of the first digital output signals to remove delays or phase shifts received from the first radio frequency signals; and a processing circuit that performs a digital beam forming algorithm using information indicated by the second digital signals.

In Example 6, the electronically scanned array antenna system of any one of Examples 1-5 can optionally include, wherein the first analog-to-digital converter circuit has a bandwidth that is greater than or equal to a bandwidth of the first summed signal.

In Example 7, the electronically scanned array antenna system of any one of Examples 1-6 can optionally include, wherein the receiver circuit further comprises: programmable tuner circuits that generate output signals that each comprise frequencies from the first radio frequency signal received by one of the first antennas.

In Example 8, the electronically scanned array antenna system of any one of Examples 1-7 can optionally include, wherein the receiver circuit further comprises: second antennas that generate second received signals indicative of frequencies of second radio frequency signals received by the second antennas; second mixer circuits that multiply frequencies from the second received signals by the frequencies of the carrier signals to generate second demodulated signals; a second summing circuit that sums frequencies from each of the second demodulated signals to generate a second summed signal; and a second analog-to-digital converter circuit that converts the second summed signal into a second digital signal.

In Example 9, the electronically scanned array antenna system of any one of Examples 1-8 can optionally further comprise a transmitter circuit, wherein the transmitter circuit comprises: a digital-to-analog converter circuit that converts a second digital signal received from a processing circuit into an analog signal; a splitter circuit that separates frequencies from the analog signal to generate split signals; filter circuits that filter frequencies from the split signals to generate filtered signals having non-overlapping bandwidths; second mixer circuits that multiply frequencies from the filtered signals by frequencies of the carrier signals to generate modulated signals; and second antennas that generate second radio frequency signals based on frequencies from the modulated signals.

Example 10 is an electronically scanned array antenna system comprising a transmitter circuit, wherein the transmitter circuit comprises: a first digital-to-analog converter circuit that converts a first digital signal into a first analog signal; a first splitter circuit that separates frequencies from the first analog signal to generate first split signals; first filter circuits that filter frequencies from the first split signals to generate first filtered signals having non-overlapping bandwidths; first mixer circuits that multiply frequencies from the first filtered signals by frequencies of carrier signals to generate first modulated signals, wherein each of the carrier signals has a unique frequency relative to the other ones of the carrier signals; and first antennas that generate first radio frequency signals based on frequencies from the first modulated signals.

In Example 11, the electronically scanned array antenna system of Example 10 can optionally include, wherein the transmitter circuit further comprises: amplification circuits that generate amplified signals by amplifying the first modulated signals, wherein the first antennas generate the first radio frequency signals based on frequencies from the amplified signals.

In Example 12, the electronically scanned array antenna system of any one of Examples 10-11 can optionally include, wherein the transmitter circuit further comprises: second filter circuits that generate second filtered signals by filtering the first modulated signals, wherein the first antennas generate the first radio frequency signals based on frequencies from the second filtered signals, and wherein the second filtered signals have substantially the same frequency bandwidth.

In Example 13, the electronically scanned array antenna system of any one of Examples 10-12 can optionally include, wherein the transmitter circuit further comprises: a processing circuit that generates phase shifted or delayed frequencies in the first digital signal using a digital beam forming algorithm to cause the first radio frequency signals generated by the first antennas to have different phases or delays in order to steer a wave front of the first radio frequency signals in a selected direction.

In Example 14, the electronically scanned array antenna system of any one of Examples 10-13 can optionally include, wherein the transmitter circuit further comprises: local oscillator circuits that generate the carrier signals, wherein the local oscillator circuits cause the carrier signals to have different frequencies, and wherein the first digital signal has frequencies that are used to generate frequencies in each of the first modulated signals.

In Example 15, the electronically scanned array antenna system of any one of Examples 10-14 can optionally include, wherein the transmitter circuit further comprises: a second digital-to-analog converter circuit that converts a second digital signal into a second analog signal; a second splitter circuit that separates frequencies from the second analog signal to generate second split signals; second filter circuits that filter frequencies from the second split signals to generate second filtered signals having non-overlapping bandwidths; second mixer circuits that multiply frequencies from the second filtered signals by frequencies of the carrier signals to generate second modulated signals; and second antennas that generate second radio frequency signals based on frequencies from the second modulated signals.

Example 16 is a method for receiving radio frequency signals at a receiver circuit in an electronically scanned array antenna system, wherein the method comprises: generating electrical signals indicative of frequencies of the radio frequency signals that are received by antennas; multiplying frequencies from the electrical signals by frequencies of carrier signals to generate demodulated signals using mixer circuits, wherein each of the carrier signals has a unique frequency relative to the other ones of the carrier signals; summing frequencies from each of the demodulated signals to generate a summed signal using a summing circuit; and converting the summed signal into a digital signal using an analog-to-digital converter circuit, wherein the analog-to-digital converter circuit causes the digital signal to have frequencies that are generated based on the electrical signals generated by each of the antennas.

In Example 17, the method of Example 16 can optionally further comprise: filtering the demodulated signals to generate filtered signals using filter circuits, wherein summing frequencies from each of the demodulated signals using the summing circuit further comprises summing frequencies from each of the filtered signals to generate the summed signal using the summing circuit.

In Example 18, the method of any one of Examples 16-17 can optionally include, wherein the analog-to-digital converter circuit has a bandwidth that is greater than or equal to a bandwidth of the summed signal.

In Example 19, the method of any one of Examples 16-18 can optionally further comprise: separating frequencies from the digital signal in the digital domain into first digital output signals based on the frequencies of the radio frequency signals received by the antennas using a channelizer circuit, wherein each of the first digital output signals has frequencies from a different one of the demodulated signals.

In Example 20, the method of any one of Examples 16-19 can optionally further comprise: generating second digital output signals by delaying or shifting phases of the first digital output signals corresponding to the direction of the beam; and performing a digital beam forming algorithm with a processing circuit using information indicated by the second digital output signals.

Example 21 is a method for transmitting radio frequency signals by a transmitter circuit in an electronically scanned array antenna system, wherein the method comprises: converting a digital signal into an analog signal using a digital-to-analog converter circuit; separating frequencies from the analog signal to generate split signals using a splitter circuit; filtering frequencies from the split signals to generate filtered signals having non-overlapping bandwidths using filter circuits; multiplying frequencies from the filtered signals by frequencies of carrier signals to generate modulated signals using mixer circuits, wherein each of the carrier signals has a unique frequency relative to the other ones of the carrier signals; and transmitting radio frequency signals that are based on frequencies from the modulated signals from antennas.

The embodiments disclosed herein can be incorporated into any suitable integrated circuit or system. For example, the embodiments disclosed herein can be incorporated into numerous types of devices such as processor integrated circuits, central processing units, memory integrated circuits, graphics processing unit integrated circuits, application specific standard products (ASSPs), application specific integrated circuits (ASICs), and programmable logic integrated circuits. Examples of programmable logic integrated circuits include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The foregoing description of the exemplary embodiments of the present invention has been presented for the purpose of illustration. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. An electronically scanned array antenna system comprising a receiver circuit, wherein the receiver circuit comprises:
   first antennas that generate first received signals indicative of first frequencies of first radio frequency signals received by the first antennas;
   first mixer circuits that multiply second frequencies from the first received signals by third frequencies of carrier signals to generate first demodulated signals, wherein each of the carrier signals has a unique frequency relative to other ones of the carrier signals;
   a first summing circuit that sums fourth frequencies from each of the first demodulated signals to generate a first summed signal;
   a first analog-to-digital converter circuit that converts the first summed signal into a first digital signal having fifth frequencies that are generated based on each of the first received signals generated by the first antennas;
   programmable tuner circuits that generate first output signals that each comprise a subset of the first frequencies received by one of the first antennas; and
   a channelizer circuit that separates the fifth frequencies from the first digital signal in a digital domain into second output signals based on the first frequencies of the first radio frequency signals received by the first antennas, wherein each of the second output signals has the fourth frequencies from a different one of the first demodulated signals.

2. The electronically scanned array antenna system of claim 1, wherein the receiver circuit further comprises:
   amplification circuits that generate amplified signals by amplifying the first received signals, wherein the first mixer circuits multiply sixth frequencies of the amplified signals by the third frequencies of the carrier signals to generate the first demodulated signals.

3. The electronically scanned array antenna system of claim 1, wherein the receiver circuit further comprises:
   amplification circuits that generate amplified signals by amplifying the first demodulated signals, wherein each of the amplification circuits comprises a low pass filter circuit that filters one of the first demodulated signals to generate one of the amplified signals, and wherein the first summing circuit sums sixth frequencies from the amplified signals to generate the first summed signal.

4. The electronically scanned array antenna system of claim 1, wherein the receiver circuit further comprises:
   timing circuits that generate third output signals by delaying or shifting phases of the second output signals.

5. The electronically scanned array antenna system of claim 4, wherein the receiver circuit further comprises:
   a processing circuit that performs a digital beam forming algorithm using information indicated by the third output signals.

6. The electronically scanned array antenna system of claim 1 further comprising filter circuits that filter the first demodulated signals to generate filtered signals, wherein the first summing circuit sums sixth frequencies from each of the filtered signals to generate the first summed signal.

7. The electronically scanned array antenna system of claim 1, wherein the first analog-to-digital converter circuit has a first bandwidth that is greater than or equal to a second bandwidth of the first summed signal.

8. The electronically scanned array antenna system of claim 1, wherein the receiver circuit further comprises:
   second antennas that generate second received signals indicative of sixth frequencies of second radio frequency signals received by the second antennas;
   second mixer circuits that multiply seventh frequencies from the second received signals by the third frequencies of the carrier signals to generate second demodulated signals;
   a second summing circuit that sums eighth frequencies from each of the second demodulated signals to generate a second summed signal; and
   a second analog-to-digital converter circuit that converts the second summed signal into a second digital signal.

9. The electronically scanned array antenna system of claim 1 further comprising a transmitter circuit, wherein the transmitter circuit comprises:
   a digital-to-analog converter circuit that converts a second digital signal received from a processing circuit into an analog signal;
   a splitter circuit that separates sixth frequencies from the analog signal to generate split signals;
   filter circuits that filter seventh frequencies from the split signals to generate filtered signals having non-overlapping bandwidths;
   second mixer circuits that multiply eighth frequencies from the filtered signals by the third frequencies of the carrier signals to generate modulated signals; and
   second antennas that generate second radio frequency signals based on ninth frequencies from the modulated signals.

10. An electronically scanned array antenna system comprising a transmitter circuit, wherein the transmitter circuit comprises:
    a first digital-to-analog converter circuit that converts a first digital signal into a first analog signal;
    a first splitter circuit that separates first frequencies from the first analog signal to generate first split signals;
    first filter circuits that filter second frequencies from the first split signals to generate first filtered signals having non-overlapping bandwidths;
    first mixer circuits that multiply third frequencies from the first filtered signals by fourth frequencies of carrier signals to generate first modulated signals, wherein each of the carrier signals has a unique frequency relative to other ones of the carrier signals;
    second filter circuits that generate second filtered signals by filtering the first modulated signals;
    first antennas that generate first radio frequency signals based on fifth frequencies from the second filtered signals; and
    a processing circuit that generates phase shifted or delayed frequencies in the first digital signal using a digital beam forming algorithm to cause the first radio frequency signals generated by the first antennas to have different phases or delays in order to steer a wave front of the first radio frequency signals in a selected direction.

11. The electronically scanned array antenna system of claim 10, wherein the transmitter circuit further comprises:
    amplification circuits that generate amplified signals by amplifying the second filtered signals, wherein the first antennas generate the first radio frequency signals based on the amplified signals.

12. The electronically scanned array antenna system of claim 10, wherein the first filter circuits are band pass filter circuits.

13. The electronically scanned array antenna system of claim 10, wherein the processing circuit generates the first digital signal using information from second radio frequency signals received by a receiver circuit.

14. The electronically scanned array antenna system of claim 10, wherein the transmitter circuit further comprises:
    local oscillator circuits that generate the carrier signals, wherein the local oscillator circuits cause the carrier signals to have different ones of the fourth frequencies.

15. The electronically scanned array antenna system of claim 10, wherein the transmitter circuit further comprises:
    a second digital-to-analog converter circuit that converts a second digital signal into a second analog signal;
    a second splitter circuit that separates sixth frequencies from the second analog signal to generate second split signals;
    third filter circuits that filter seventh frequencies from the second split signals to generate third filtered signals having non-overlapping bandwidths;
    second mixer circuits that multiply eighth frequencies from the third filtered signals by the fourth frequencies of the carrier signals to generate second modulated signals; and
    second antennas that generate second radio frequency signals based on ninth frequencies from the second modulated signals.

16. A method for receiving radio frequency signals at a receiver circuit in an electronically scanned array antenna system, wherein the method comprises:
    generating electrical signals indicative of first frequencies of the radio frequency signals that are received by antennas;
    multiplying second frequencies from the electrical signals by third frequencies of carrier signals to generate demodulated signals using mixer circuits, wherein each of the carrier signals has a unique frequency relative to other ones of the carrier signals;
    filtering the demodulated signals to generate filtered signals using filter circuits;
    summing fourth frequencies from each of the filtered signals to generate a summed signal using a summing circuit;
    converting the summed signal into a digital signal using an analog-to-digital converter circuit, wherein the analog-to-digital converter circuit causes the digital signal to have fifth frequencies that are generated based on the electrical signals generated by the antennas; and
    separating the fifth frequencies from the digital signal in a digital domain into first digital output signals based on the first frequencies of the radio frequency signals received by the antennas using a channelizer circuit, wherein each of the first digital output signals has sixth frequencies from a different one of the demodulated signals.

17. The method of claim 16, wherein each of the demodulated signals has a non-overlapping spectrum of seventh frequencies.

18. The method of claim 16, wherein the analog-to-digital converter circuit has a first bandwidth that is greater than or equal to a second bandwidth of the summed signal.

19. The method of claim 16 further comprising:
generating second digital output signals by delaying or shifting phases of the first digital output signals corresponding to a direction of a beam.

20. The method of claim 19 further comprising:
performing a digital beam forming algorithm with a processing circuit using information indicated by the second digital output signals.

* * * * *